US008807499B2

(12) United States Patent
Ripke

(10) Patent No.: US 8,807,499 B2
(45) Date of Patent: Aug. 19, 2014

(54) WALL PLAQUE AND METHOD OF ATTACHING THE WALL PLAQUE TO A LOAD AND TO A WALL

(76) Inventor: Bartley Neil Ripke, Oakwood, OH (US)

( * ) Notice: Subject to any disclaimer, the term of this patent is extended or adjusted under 35 U.S.C. 154(b) by 157 days.

(21) Appl. No.: 13/438,222

(22) Filed: Apr. 3, 2012

(65) Prior Publication Data

US 2013/0256476 A1 Oct. 3, 2013

(51) Int. Cl.
*F16M 11/00* (2006.01)

(52) U.S. Cl.
USPC ............. 248/201; 248/466; 248/489; 40/757; 428/16

(58) Field of Classification Search
CPC ........ G06F 1/12; A47G 1/162; A47G 1/1633; B44C 5/02; B44C 5/04; B44C 5/06
USPC ............ 248/201, 466, 489, 494, 497; 40/757, 40/790, 737, 746, 747; 428/16, 542.4
See application file for complete search history.

(56) References Cited

U.S. PATENT DOCUMENTS

| | | | | |
|---|---|---|---|---|
| 1,809,786 | A * | 6/1931 | Le Jeune | 40/757 |
| 2,263,901 | A * | 11/1941 | Olney | 248/496 |
| 2,354,622 | A * | 7/1944 | Swartz | 40/800 |
| 2,771,262 | A * | 11/1956 | Laystrom | 248/489 |
| 3,031,159 | A * | 4/1962 | Waller | 52/544 |
| 3,319,922 | A * | 5/1967 | Christensen | 40/800 |
| 3,707,053 | A * | 12/1972 | Itano | 40/781 |
| 4,161,834 | A * | 7/1979 | Hendricks, Jr. | 40/606.09 |
| 5,015,532 | A * | 5/1991 | Knight | 428/542.4 |
| 5,472,765 | A * | 12/1995 | Green | 428/99 |
| 6,170,185 | B1 * | 1/2001 | Donofrio, Jr. | 40/800 |
| 6,575,418 | B1 * | 6/2003 | Riday | 248/317 |
| 7,089,883 | B2 | 8/2006 | Choe | |
| 7,441,741 | B2 * | 10/2008 | Wong | 248/477 |
| 2006/0164923 | A1 * | 7/2006 | Feister | 368/276 |
| 2007/0256343 | A1 | 11/2007 | Yoon | |
| 2008/0241460 | A1 * | 10/2008 | Porter | 428/99 |
| 2010/0084539 | A1 * | 4/2010 | Popkin et al. | 248/475.1 |

FOREIGN PATENT DOCUMENTS

| | | |
|---|---|---|
| BE | 1011154 | 5/1999 |
| DE | 29617566 | 11/1996 |
| DE | 29905878 | 6/1999 |
| DE | 202009017349 | 5/2010 |
| GB | 2077972 | 12/1981 |

* cited by examiner

*Primary Examiner* — Anita M King
(74) *Attorney, Agent, or Firm* — Clark Hill PLC

(57) ABSTRACT

A wall plaque and its method of attachment to a load and to a wall is provided. A decorative glass plate has first and second pairs of apertures. A bushing is loosely seated in each aperture. The load is placed against the front surface of the glass plate and overlaps the apertures. A hanger seats against the first pair of bushings and is attached to the load by fasteners which extend through the hanger and bushings and into the load. A spacer seats against the second pair of bushings and is attached to the load by fasteners which extend through the spacer and bushings into the load. An anchor is mounted to the wall where the load is to be hung. After the load is assembled with the glass plate, the hanger seats on the anchor to easily mount the load onto the wall.

25 Claims, 4 Drawing Sheets

WALL PLAQUE AND METHOD OF ATTACHING THE WALL PLAQUE TO A LOAD AND TO A WALL

FIELD OF THE INVENTION

The present invention relates to a wall plaque for mounting a load, such as a deer head, to a wall. The wall plaque and load are assembled prior to mounting on the wall. The wall plaque includes a decorative glass plate which is not subjected to stresses from the load.

BACKGROUND OF THE INVENTION

Hunters commonly desire to hang trophy size deer heads on a wall plaque for displaying the deer head in their home. The back of the deer head is attached to a piece of wood and the hide is wrapped around the wood. The piece of wood is attached to another larger piece of wood which may be decorated. This larger piece of wood is then hung on the wall by nails.

The present invention provides a wall plaque which provides an easy means of mounting a load, such as a deer head, to a wall. Features and advantages of the present wall plaque will become apparent upon a reading of the attached specification, in combination with a study of the drawings.

SUMMARY OF THE INVENTION

A wall plaque and its method of attaching the wall plaque to a load and to a wall is provided. A decorative glass plate has first and second pairs of apertures provided therethrough. A bushing is loosely seated in each aperture. The load is placed against the front surface of the glass plate such that it overlaps the apertures. A hanger seats against the first pair of bushings and is attached to the load by fasteners which extend through the hanger, through the bushings and into the load. A spacer seats against the second pair of bushings and is attached to the load by fasteners which extend through the spacer, through the bushings and into the load. An anchor is mounted to the wall where the load is to be hung. After the load is assembled with the decorative glass plate, the hanger is seated on the anchor to easily mount the load onto the wall.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENT

Figure 1:
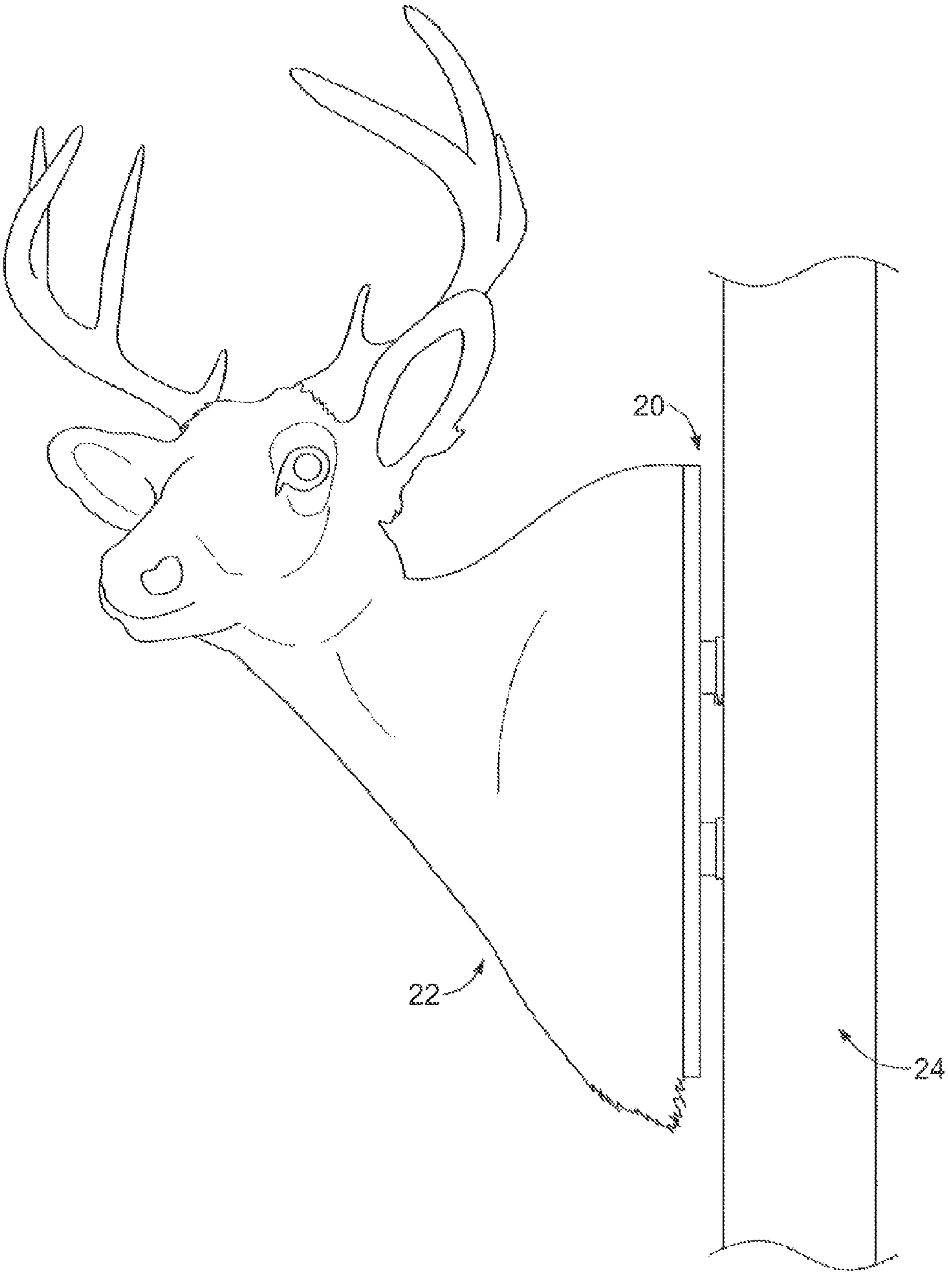
FIG. 1 is a perspective view of a wall plaque which incorporates the features of the present invention, a load mounted on the wall plaque, and the wall plaque and load mounted onto a wall.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein. Therefore, unless otherwise noted, features disclosed herein may be combined together to form additional combinations that were not otherwise shown for purposes of brevity.

FIG. 1 shows a wall plaque 20 which incorporates the features of the present invention which is used to mount a load, for example a deer head 22, to a wall 24. The deer head 22 is mounted to the wall plaque 20 prior to the wall plaque 20 being mounted onto the wall 24. The ensures the proper mounting the deer head 22 onto the wall plaque 20. The load is described as a deer head 22 herein, however, it is to be understood that a variety of different kinds of loads could be mounted on the wall plaque 20.

The deer head 22 is prepared in the standard way for mounting. The back of the deer head 22 has a wooden board 23 attached thereto in a known manner. The hide 25 of the deer is wrapped around the edges of the board 23. As a result, a recess 27 is formed by the edges of the hide 25 and the board 23.

Figure 2:
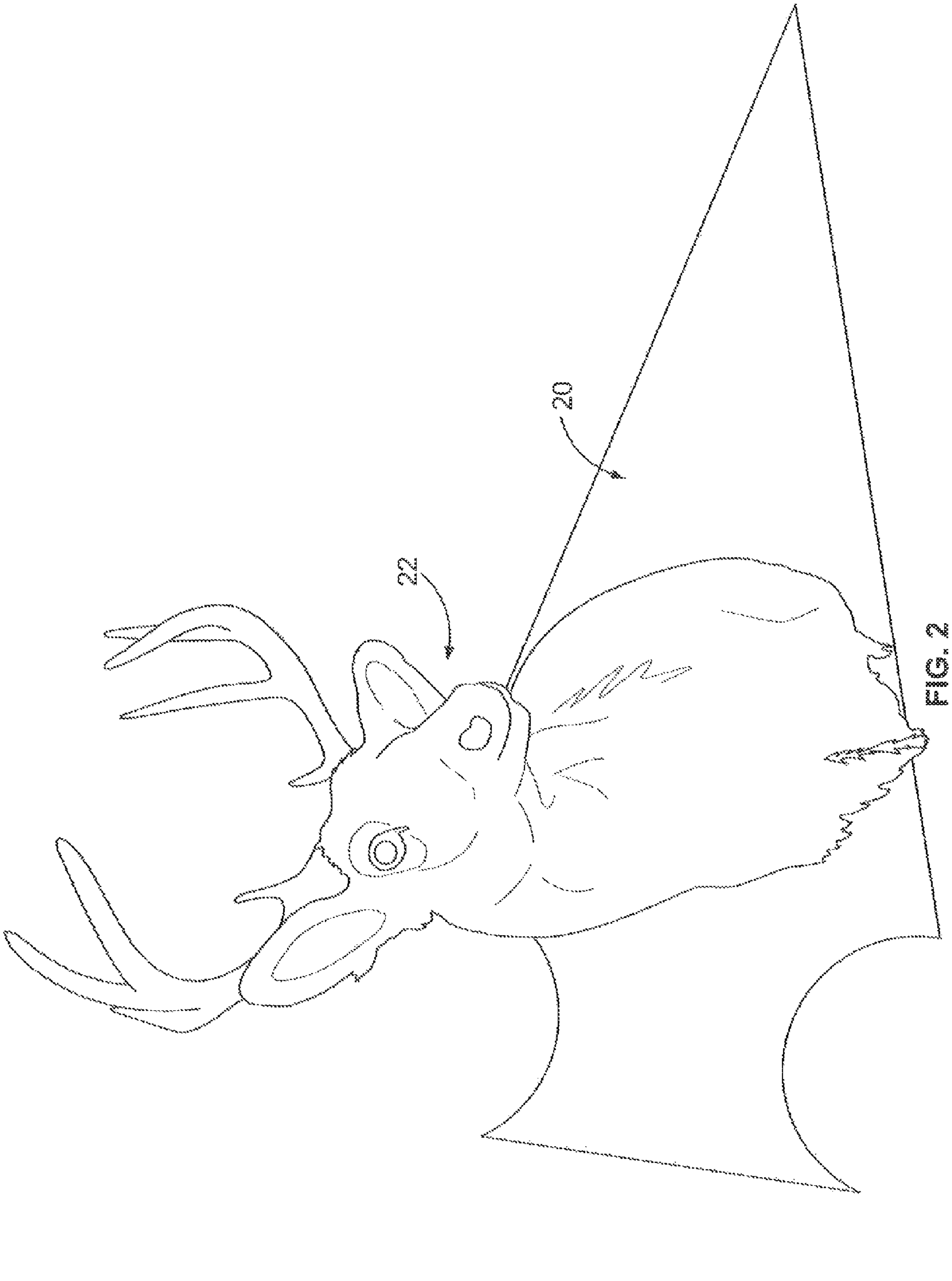
FIG. 2 is a front elevational view of the wall plaque and load.
Figure 3:
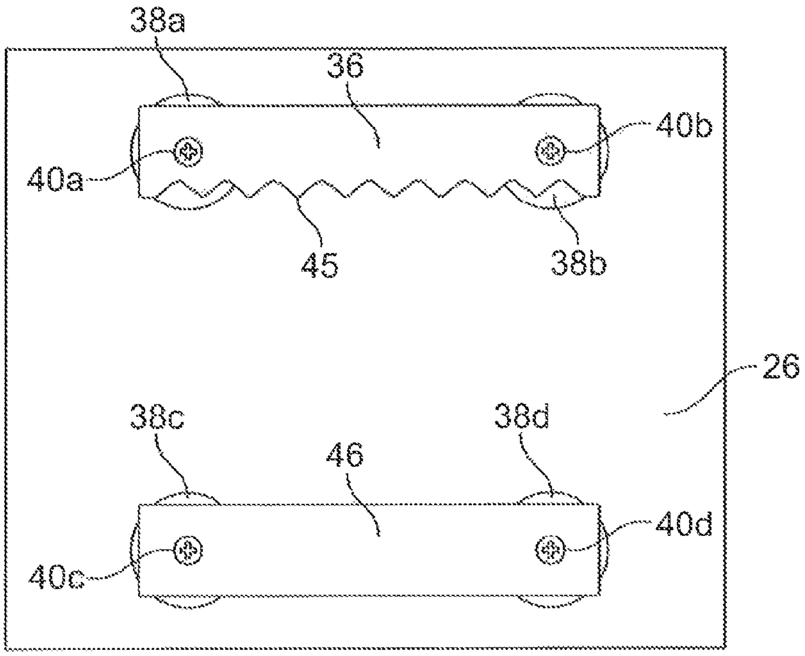
FIG. 3 is rear elevational view of the wall plaque.
Figure 4:
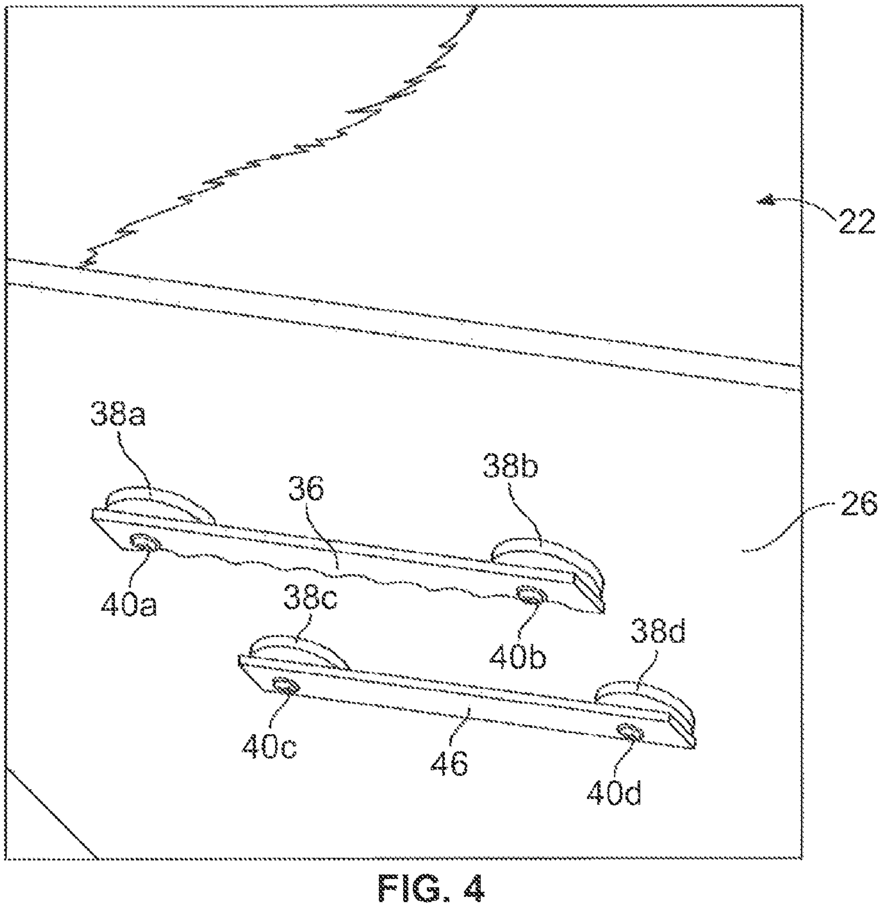
FIG. 4 is a rear perspective view of the wall plaque and load.
Figure 5:
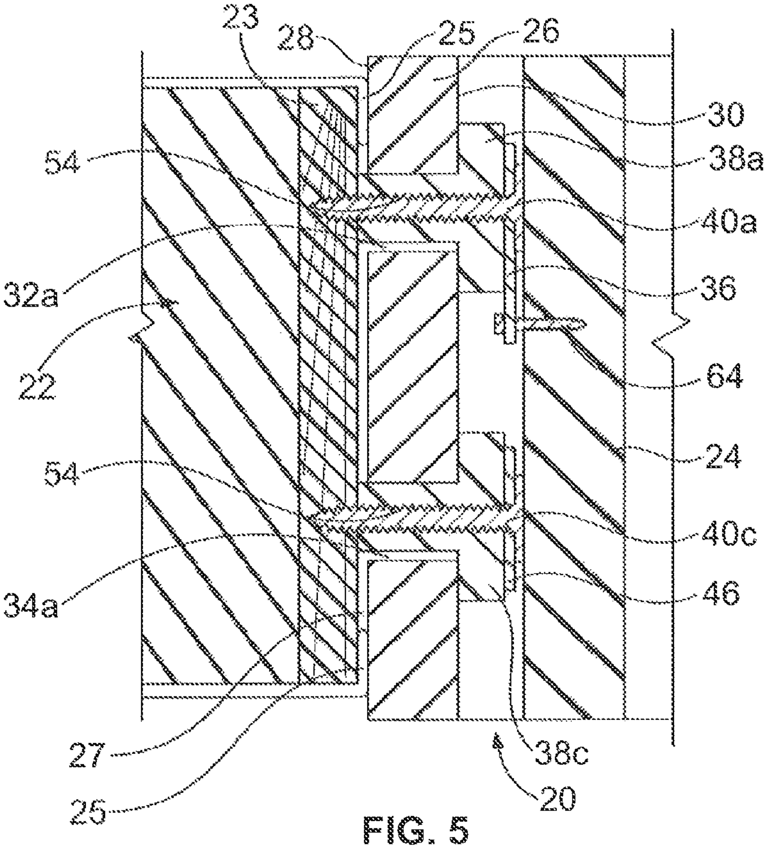
FIG. 5 is a cross-sectional view of the wall plaque and load mounted onto the wall.
Figure 6:
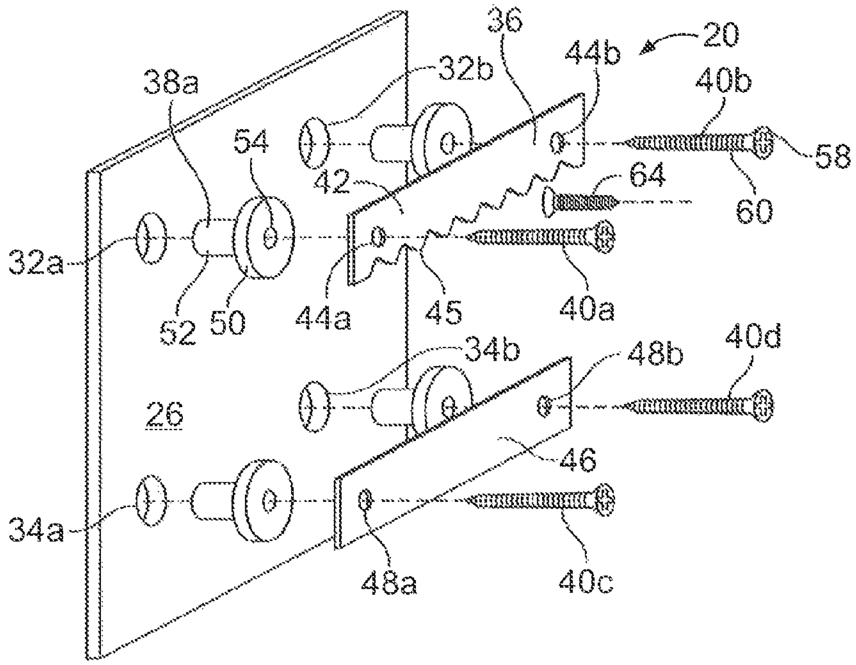
FIG. 6 is an exploded view of the wall plaque.

The wall plaque 20 includes a decorative glass plate 26. The glass plate 26 has front and back surfaces 28, 30. An upper pair of spaced apart apertures 32*a*, 32*b* are provided through the glass plate 26 and a lower pair of spaced apart apertures 34*a*, 34*b* are provided through the glass plate 26. As shown, the apertures 32*a*, 32*b* in the upper set are aligned with the apertures 34*a*, 34*b* in the lower set, however, this spacing is preferred, but not required. The glass plate 26 is preferably bronze reflective glass with silver spray on the back surface 30, so that a mirror is formed on the front surface 28. The glass plate 26 can be cut into any desired shape. As shown in FIG. 2, the glass plate 26 is cut generally into an arrow head shape.

A hanger 36 mounts with the upper pair of apertures 32*a*, 32*b* by a pair of bushings 38*a*, 38*b* and a pair of fasteners 40*a*, 40*b*. The hanger 36 is preferably formed of metal and has an elongated body 42 with a pair of spaced apart apertures 44*a*, 44*b* provided therethrough. The lower edge of the body 42 has a plurality of teeth 45 (which may be jagged as shown, undulating or a simple cut out which accommodates the anchor 64 described herein) and the upper edge of the body 42 is preferably straight.

A spacer 46 mounts with the lower pair of apertures 34*a*, 34*b* by a pair of bushings 38*c*, 38*d* and a pair of fasteners 40*c*, 40*d*. The spacer 46 is formed of plastic, preferably nylon, and has an elongated body with a pair of spaced apart apertures 48*a*, 48*b* provided therethrough. The upper and lower edges of the spacer body are preferably straight. The spacer 46 has a predetermined thickness. While one spacer 46 is shown which spans the two apertures 34*a*, 34*b* and their associated bushings 38*c*, 38*d*, it is to be understood that a pair of spacers (not shown) may be provided. In addition, the edges of the spacer 46 can take any of a variety of shapes. In addition, the spacer 46 can be the same length as the hanger 36, can be wider than the hanger 36, or can be shorter than the hanger 36.

Each bushing 38*a*, 38*b*, 38*c*, 38*d* is plastic, preferably nylon, and seats within the respective aperture 32*a*, 32*b*, 34*a*, 34*b*. Each bushing 38*a*, 38*b*, 38*c*, 38*d* has an enlarged head 50 with a shank 52 extending therefrom. A central passageway 54 extends through the head 50 and the shank 52. The shank 52 of each bushing 38*a*, 38*b*, 38*c*, 38*d* seats within the associated aperture 32*a*, 32*b*, 34*a*, 34*b* and the head 50 seats against the back surface 30 of the glass plate 26. The free end of the shank 52 extends outwardly from the front surface 28 of the glass plate 26. The apertures 32*a*, 32*b*, 34*a*, 34*b* through the glass plate 26 are larger than the shanks 52 of the bushing 38*a*, 38*b*, 38*c*, 38*d*. Therefore, the shank 52 of each bushing 38*a*, 38*b*, 38*c*, 38*d* is loosely fitted into the glass plate 26 such that there is “play” between the bushings 38*a*, 38*b*, 38*c*, 38*d* and the glass plate 26. As a result, the glass plate 26 “hangs” on the bushings 38*a*, 38*b*, 38*c*, 38*d*. The glass plate 26 can move upwardly and downwardly on the bushings 38*a*, 38*b*, 38*c*, 38*d*, and can move forwardly and rearwardly on the shanks 52 of the bushings 38*a*, 38*b*, 38*c*, 38*d*.

The front side of the hanger 36 seats against the heads 50 of the upper set of bushings 38*a*, 38*b* such that the apertures 44*a*, 44*b* through the hanger 36 align with the central passageways 54 of the upper set of bushings 38*a*, 38*b*. The front side of the spacer 46 seats against the heads 50 of the lower set of bushings 38*c*, 38*d* such that the apertures 48*a*, 48*b* through the spacer 46 align with the central passageways 54 of the lower set of bushings 38*c*, 38*d*.

Each fastener 40*a*, 40*b*, 40*c*, 40*d* has a driving head 58 with a threaded shank 60 extending therefrom. The threaded shank 60 extends through the respective aperture 44*a*, 44*b*, 48*a*, 48*b* in the hanger 36 or spacer 46 and is screwed into the central passageway 54 of the respective bushing 38*a*, 38*b*, 38*c*, 38*d*. The fasteners 40*a*, 40*b*, 40*c*, 40*d* may be self-tapping, or the central passageways 54 may be threaded prior to insertion of the respective fastener 40*a*, 40*b*, 40*c*, 40*d* therein. As shown, the heads 58 of the upper set of fasteners 40*a*, 40*b* lay against the rear side of the hanger 36. Alternatively, the hanger 36 can have a sufficient thickness and be provided with a counter sink (not shown) such that the heads 58 of the fasteners 40*a*, 40*b* are flush with the rear side of hanger 36. As shown, the heads 58 of the lower set of fasteners 40*c*, 40*d* lay against the rear side of the spacer 46. Alternatively, the spacer 46 can have a sufficient thickness and be provided with a counter sink (not shown) such that the heads 58 of the fastener 40*c*, 40*d* are flush with the rear side of spacer 46.

The shanks 60 of the fasteners 40*a*, 40*b*, 40*c*, 40*d* extend forwardly of the end of the bushings 38*a*, 38*b*, 38*c*, 38*d* and are screwed into the wooden board 23 of the deer head 22 to assemble the decorative glass plate 26 to the deer head 22. The ends of the shanks 52 of the bushings 38*a*, 38*b*, 38*c*, 38*d* which extend forwardly of the glass plate 26 span the gap formed by the recess 27 which results from the thickness of the deer hide 25. As a result, the deer hide 25 seats against the front surface 28 of the decorative glass plate 26.

This assembly is done before the attachment of the combined deer head 22 and wall plaque 20 to the wall 24. Since this assembly is done prior to attachment to the wall 24, one person can easily hang the assembly onto the wall 24.

To complete the mounting of the wall plaque 20 to the wall 24, a standard anchor 64 is attached to the wall 24 by known means. To hang the assembled wall plaque 20 and deer head 22, a single user can simply hang the hanger 36 onto the anchor 64 such that the teeth 45 of the hanger 36 interengage with the anchor 64. In addition, more than a single anchor 64 can be mounted on the wall 24 and engage with the teeth 45 of the hanger 36. Therefore, the wall plaque 20 and deer head 22 are easily mounted onto the wall 24 by a single user. The spacer 46 abuts against the wall 24 to prevent the wall plaque 20 from rocking.

As a result of the structure of the wall plaque 20, the forces from the deer head 22 are transferred to the wall 24 through the fasteners 40*a*, 40*b* (forces from the deer head 22 are also transferred through fasteners 40*c*, 40*d*). The decorative glass plate 26 is not subjected to the forces as the glass plate 26 “hangs” on the bushings 38*a*, 38*b*, 38*c*, 38*d*. Therefore, the decorative glass plate 26 is much less likely subjected to damage.

If desired, felt, tissue paper or some other known cushion (not shown) can be provided between the board 23 and the glass plate 26 and/or provided between the bushings 38*a*, 38*b*, 38*c*, 38*d* and the glass plate 26 to further deter damage to the glass plate 26.

While a preferred embodiment of the present invention is shown and described, it is envisioned that those skilled in the art may devise various modifications of the present invention without departing from the spirit and scope of the appended claims.

The invention claimed is:

1. A wall plaque having a load mounted thereon prior to mounting onto a wall comprising:

a glass plate having front and back surfaces and a pair of spaced apart apertures provided therethrough, each said aperture having a predetermined dimension;

a bushing seated within each said aperture such that a pair of bushings are provided, each said bushing having a predetermined dimension, each said aperture being larger in dimension than said respective bushing such that said bushings are loosely mounted within said apertures, thereby providing play between each said bushing and said glass plate, each said bushing having a central passageway provided therethrough;

a hanger having an elongated body with an upper edge and a lower edge, and having a pair of spaced apart apertures provided therethrough, said lower edge having teeth thereon for mating with an associated anchor mounted to the wall, said hanger abutting against said bushing such that said apertures aligns with said central passageways; and a fastener extending through each of said apertures of said hanger, through said associated bushing and further extending outwardly of said front surface of said glass plate to define free ends of said fasteners, said free ends of said fasteners capable of being attached to said load.

2. A wall plaque as defined in claim 1, further including an anchor engageable with the wall and with said teeth of said hanger.

3. A wall plaque as defined in claim 1, wherein said glass plate further includes a second pair of apertures provided therethrough, said second pair of apertures being spaced apart from each other by a distance, said second pair of apertures being spaced apart from said first defined apertures, each said aperture in said second pair having a predetermined dimension;

a bushing seated within each of said second pair of apertures such that a second pair of bushings are provided, each said bushing in said second pair having a predetermined dimension, each said aperture in said second pair being larger in dimension than said respective bushing in said second pair such that said bushings in said second pair are loosely mounted within said apertures of said second pair, each said bushing in said second pair having a central passageway provided therethrough;

at least one spacer for engaging said second pair of bushings; and a fastener extending through each of said apertures of said spacer, through said associated bushing and further extending outwardly of said front surface of said glass plate to define free ends of said fasteners of said second pair, said free ends of said fasteners capable of being attached to said load.

4. A wall plaque as defined in claim 3, wherein said at least one spacer is formed of plastic.

5. A wall plaque as defined in claim 3, wherein one spacer is provided which spans the distance between said second pair of apertures.

6. A wall plaque as defined in claim 3, wherein each said bushing is formed of nylon.

7. A wall plaque as defined in claim 1, wherein said glass plate is bronze reflective glass.

8. A wall plaque as defined in claim 7, wherein silver spray is sprayed onto said back surface of said glass plate.

9. A wall plaque as defined in claim 7, wherein glass plate is formed in the shape of an arrow head.

10. A wall plaque as defined in claim 1, wherein said hanger is formed of metal.

11. A wall plaque as defined in claim 1, wherein each said bushing is formed of nylon.

12. A method of attaching a load to a wall comprising:
- providing a glass plate having front and back surfaces and a pair of spaced apart apertures therethrough, each said aperture having a predetermined dimension;
- seating a bushing within each said aperture such that a pair of bushings are provided, each said bushing having a predetermined dimension, each said aperture being larger in dimension than said respective bushing such that said bushings are loosely mounted within said apertures, thereby providing that there is play between each said bushing and said glass plate, each said bushing having a central passageway provided therethrough;
- placing a load against said front surface of said glass plate such that said load overlaps said apertures;
- providing a hanger having an elongated body with an upper edge and a lower edge, and having a pair of spaced apart apertures provided therethrough, said lower edge having teeth thereon;
- placing said hanger against said bushing such that said apertures in said hanger align with said central passageways of said bushings;
- seating a fastener through a respective one of said apertures first through said hanger, second through said associated bushing, and third into said load;
- mounting an anchor to the wall where the load is to be hung; and
- seating said hangar on said anchor to mount said load onto the wall.

13. A method as defined in claim 12, further including
- providing a second pair of apertures through said glass plate, each said aperture in said second pair having a predetermined dimension, said second pair of apertures being spaced apart from each other by a distance, said second pair of apertures being spaced apart from said first defined apertures;
- seating a bushing within each of said second pair of apertures such that a second pair of bushing are provided, each said bushing in said second pair having a predetermined dimension, each said aperture in said second pair being larger in dimension than said respective bushing in said second pair such that said bushings in said second pair are loosely mounted within said apertures in said second pair, each said bushing in said second pair having a central passageway provided therethrough;
- providing at least one spacer for engaging said second pair of bushings;
- placing said at least one spacer against said second pair of bushings such that said apertures in said at least one spacer align with said central passageways of said second pair of bushings; and
- seating a fastener through a respective one of said apertures first through said spacer, second through said associated bushing, and third into said load prior to attaching said load to the wall.

14. A wall plaque having a load mounted thereon prior to mounting onto a wall comprising:
- a glass plate having front and back surfaces and first and second pairs of apertures provided therethrough, each said aperture in said first pair having a predetermined dimension, said second pair of apertures being spaced apart from each other by a distance, said second pair of apertures being spaced apart from said first pair of apertures, each said aperture in said second pair having a predetermined dimension;
- a bushing seated within each of said first pair of apertures such that a first pair of bushings are provided, each said bushing in said first pair of apertures having a predetermined dimension, each said aperture in said first pair being larger in dimension than said respective bushing in said first pair such that said bushings in said first pair are loosely mounted within said apertures of said first pair, each said bushing in said first pair having a central passageway provided therethrough;
- a hanger having an elongated body with an upper edge and a lower edge, and having a pair of spaced apart apertures provided therethrough, said lower edge having teeth thereon for mating with an associated anchor mounted to the wall, said hanger abutting against said first pair of bushings such that said apertures align with said central passageways;
- a fastener extending through each of said apertures of said hanger, through said associated bushing and further extending outwardly of said front surface of said glass plate to define free ends of said fasteners, said free ends of said fasteners capable of being attached to said load;
- a bushing seated within each of said second pair of apertures such that a second pair of bushings are provided, each said bushing in said second pair having a predetermined dimension, each said aperture in said second pair being larger in dimension than said respective bushing in said second pair such that said bushings in said second pair are loosely mounted within said apertures of said second pair, each said bushing in said second pair having a central passageway provided therethrough;
- at least one spacer for engaging said second pair of bushings; and
- a fastener extending through each of said apertures of said spacer, through said associated bushing and further extending outwardly of said front surface of said glass plate to define free ends of said fasteners of said second pair, said free ends of said fasteners capable of being attached to said load.

15. A wall plaque as defined in claim 14, further including an anchor engageable with the wall and with said teeth of said hanger.

16. A wall plaque as defined in claim 14, wherein said at least one spacer is formed of plastic.

17. A wall plaque as defined in claim 14, wherein one spacer is provided which spans the distance between said second pair of apertures.

18. A wall plaque as defined in claim 14, wherein each said bushing is formed of nylon.

19. A wall plaque as defined in claim 14, wherein said glass plate is bronze reflective glass.

20. A wall plaque as defined in claim 19, wherein silver spray is sprayed onto said back surface of said glass plate.

21. A wall plaque as defined in claim 19, wherein glass plate is formed in the shape of an arrow head.

22. A wall plaque as defined in claim 14, wherein said hanger is formed of metal.

23. A wall plaque as defined in claim 14, wherein each said bushing is formed of nylon.

24. A method of attaching a load to a wall comprising:

providing a glass plate having front and back surfaces, a first pair of spaced apart apertures therethrough, and a second pair of spaced apart apertures therethrough, each said aperture in said first pair having a predetermined dimension, each said aperture in said second pair having a predetermined dimension, said second pair of apertures being spaced apart from said first pair of apertures;

seating a bushing within each said aperture in said first pair such that a first pair of bushings are provided, each said bushing of said first pair having a predetermined dimension, each said aperture in said first pair being larger in dimension than said respective bushing of said first pair such that said bushings of said first pair are loosely mounted within said apertures in said first pair, each said bushing of said first pair having a central passageway provided therethrough;

seating a bushing within each said aperture in said second pair such that a second pair of bushings are provided, each said bushing of said second pair having a predetermined dimension, each said aperture in said second pair being larger in dimension than said respective bushing of said second pair such that said bushings of said second pair are loosely mounted within said apertures in said second pair, each said bushing in said second pair having a central passageway provided therethrough;

placing a load against said front surface of said glass plate such that said load overlaps said apertures of said first pair;

providing a hanger having an elongated body with an upper edge and a lower edge, and having a pair of spaced apart apertures provided therethrough, said lower edge having teeth thereon;

placing said hanger against said first pair of bushings such that said apertures in said hanger align with said central passageways of said first pair of bushings;

providing at least one spacer for engaging said second pair of bushings;

placing said at least one spacer against said second pair of bushings such that said apertures in said at least one spacer align with said central passageways of said second pair of bushings;

seating a fastener through a respective one of said apertures first through said hanger, second through said associated bushing, and third into said load;

seating a fastener through a respective one of said apertures first through said spacer, second through said associated bushing, and third into said load;

mounting an anchor to the wall where the load is to be hung; and seating said hanger on said anchor to mount said load onto the wall.

25. A wall plaque having a load mounted thereon prior to mounting onto a wall comprising:

a glass plate having front and back surfaces and a pair of spaced apart apertures provided therethrough, each said aperture having a predetermined dimension;

a bushing seated within each said aperture such that a pair of bushings are provided, each said bushing having a predetermined dimension, each said aperture being larger in dimension than said respective bushing such that said bushings are loosely mounted within said apertures, each said bushing having a central passageway provided therethrough;

a hanger having an elongated body with an upper edge and a lower edge, and having a pair of spaced apart apertures provided therethrough, said lower edge having teeth thereon for mating with an associated anchor mounted to the wall, said hanger abutting against said bushing such that said apertures aligns with said central passageways; and a fastener extending through each of said apertures of said hanger, through said associated bushing and further extending outwardly of said front surface of said glass plate to define free ends of said fasteners, said free ends of said fasteners capable of being attached to said load, wherein said load comprises an animal head having a hide, wherein the hide is seated against the front surface of the glass plate.

* * * * *